Fig. 1

Nov. 3, 1942.   W. H. KEILER   2,300,933
LOCOMOTIVE DRAFTING
Filed May 15, 1941   6 Sheets-Sheet 2

Main Air Reservoir

Inventor
Westfield H. Keiler
By Dyle + Kirchner
Attorneys

Nov. 3, 1942.                    W. H. KEILER                    2,300,933
                              LOCOMOTIVE DRAFTING
                              Filed May 15, 1941            6 Sheets-Sheet 3

Inventor
Westfield H. Keiler
Dye & Kirchner
Attorneys

Nov. 3, 1942.   W. H. KEILER   2,300,933
LOCOMOTIVE DRAFTING
Filed May 15, 1941   6 Sheets-Sheet 4

Nov. 3, 1942.　　　　W. H. KEILER　　　　2,300,933
LOCOMOTIVE DRAFTING
Filed May 15, 1941　　　　6 Sheets-Sheet 5

Inventor
Westfield H. Keiler
Dye + Kirchner
Attorneys

Boiler or back pressure steam.

Patented Nov. 3, 1942

2,300,933

UNITED STATES PATENT OFFICE 2,300,933

LOCOMOTIVE DRAFTING

Westfield H. Keiler, Bethesda, Md.

Application May 15, 1941, Serial No. 393,638

35 Claims. (Cl. 230—100)

This invention relates to draft and back pressure regulating devices for locomotive smoke boxes and is a continuation in part of my copending applications Serial No. 360,850, filed October 11, 1940, and Serial No. 355,387, filed September 4, 1940, the former application being a continuation of application Serial No. 315,420, filed January 24, 1940.

The drafting of a steam locomotive is produced by the aspirating effect of a jet of exhaust steam blasted through a zone of the smoke box and into the stack. The amount of draft, and consequently the rate of fuel consumption in the fire box and of steam generation in the boiler, are determined by the quantity and velocity of steam thus exhausted. Inasmuch as the standard arrangement in the smoke box comprises exhausting steam from the discharge ports through an exhaust steam pipe spaced below the stack or stack extension, it is evident that for any given quantity of steam exhausted during unit time the amount of draft will be proportional to the velocity of the jet. It will also be evident that jet velocity will be a function of the orifice area of the exhaust steam pipe nozzle for any given quantity of steam exhausted in unit time.

Under different conditions of operation the draft requirements vary widely, and unless these requirements are satisfied the results are insufficient combustion or a too rapid rate of combustion. Locomotive designers have long appreciated the desirability of varying the exhaust steam pipe orifice area to suit changes in draft requirements en route as the engine encounters different load conditions, and numerous attempts have been made to provide means for selectively varying such orifice area at the will of the engineer, or automatically in response to boiler conditions, but all such attempts have, so far as I am aware, proved to be inoperative or impractical.

The failure of the hitherto proposed orifice-varying means has been so conspicuous that the standard arrangement at the present time involves striking a compromise between the large and small orifice areas that would respectively satisfy the low and high draft requirements and permanently mounting on the exhaust pipe a cap or tip of the compromise orifice area. The inefficiency of such a compromise cap or tip will be evident from the following:

When the locomotive is worked at or near maximum capacity, as when the train is being started or a grade is being ascended at low speed, the throttle is open wide and the valves are operating at or near their longest stroke, so that maximum demand for steam pressure is made on the boiler, but because the speed is low the interval between exhaust blasts is great and the slow rate of exhaust requires a small orifice area to maintain adequate draft. It has been necessary to employ a compromise orifice area small enough to make the locomotive draft properly under such conditions. However, when the speed increases and the rate of exhaust becomes more rapid, so that the quantities of steam then being exhausted are sufficient to provide adequate draft at reduced velocity, it is desirable, in order to reduce back pressure, to reduce exhaust velocity. The small orifice area that was required for the heavy load demand is now too small for efficient operation because it produces excessive back pressure and the result is that the locomotive operates under the new conditions at considerably impaired efficiency.

The present invention provides means for varying the exhaust nozzle orifice area en route either automatically in response to changes in operating conditions such as those suggested above and others which will be indicated hereinafter, or selectively at the option of the engineer to meet special or anticipated requirements.

A primary object, therefore, of the invention is the provision of a plurality of caps or tips providing different orifice areas which can be selectively put into operative position on the exhaust steam pipe as required by different conditions encountered during operation of the locomotive.

A further object is the provision of means for mounting a detachable cap or tip which will function throughout extending periods of attachment as perfectly as a permanently mounted cap or tip.

Another object is the varying of exhaust nozzle orifice areas without materially altering the exhaust steam impingement line in the stack.

Another object is to provide means for mounting a readily removable tip on the exhaust steam pipe which will accurately maintain a constant orifice area despite the presence in the exhaust steam of carbonizable lubricating oil.

A related object is concerned with the use of means for holding a detachable tip in operative position on the exhaust steam pipe that will maintain a practically steam-tight fit between the engaged areas of the pipe and cap despite wear of the parts.

An additional object of a preferred form of embodiment is the provision of electrical operating means for effecting the interchange of tips, Another object is to effect movement of an applied and a retracted tip sequentially in that order, when the tips are to be interchanged, so that mutual interference of the moving tips will be prevented.

Another object is to maintain adequate draft under varying operating conditions while at the same time reducing back pressure.

A related object is the maintenance of proper draft under varying operating conditions so as to prevent excessive velocity of products of combustion through the fire and stack and thereby materially reduce the so called cinder cutting of fire box sheets, flues, superheater units, smoke stacks, etc.

Certain additional principal objects and advantages of the invention will be referred to, or will be sufficiently evident to those skilled in the art, as the description of preferred forms of embodiment of the invention proceeds hereinafter. These embodiments are selected for illustration merely, without any intention of limiting the scope of the invention to the details thereof, since these details may be varied widely without departing from the principles of the invention as pointed out in the appended claims.

In the drawings, where the same reference character designates the same part in the several views.

Figures 2, 3, 4:
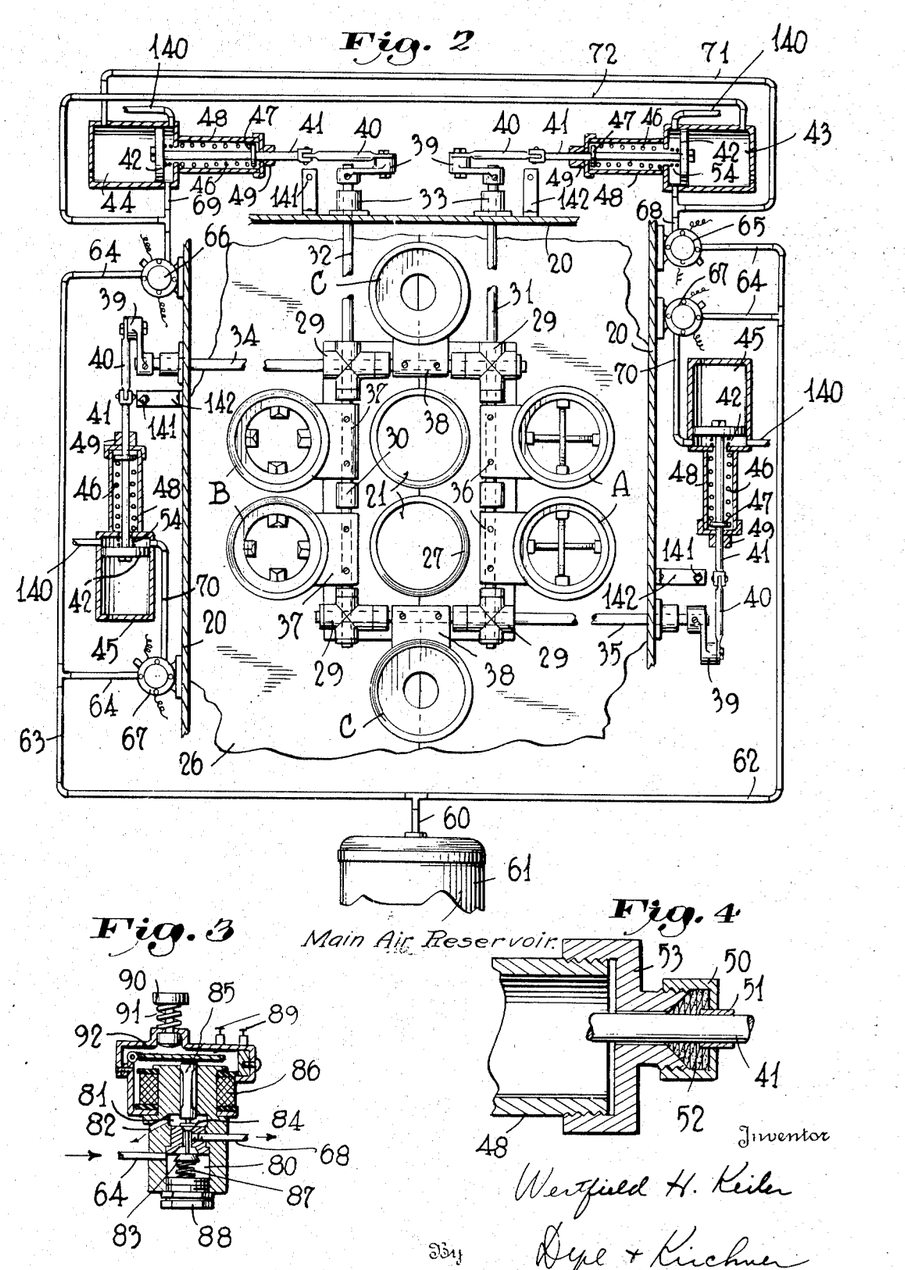
Fig. 2 is a horizontal cross sectional view through the smoke box showing in greater detail and on a relatively enlarged scale the mounting of the tips of Fig. 1.
Fig. 3 is an axial section of one of the magnet valves for controlling the fluid pressure supply to the operating cylinders for the tips.
Fig. 4 is a detail of a stuffing box for one of the operating cylinders.
Figure 5:
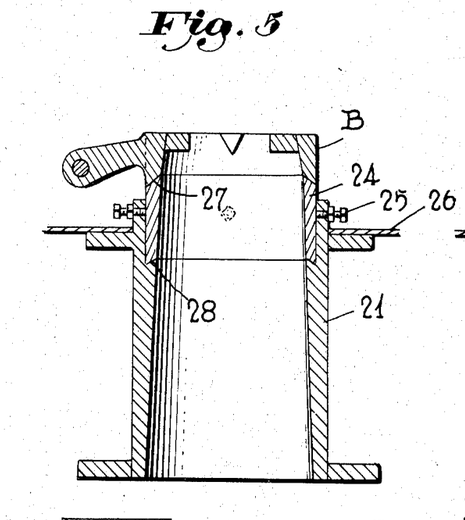
Fig. 5 is an axial section through one of the exhaust steam pipes showing one of the tips seated thereon in operative position.
Figure 6:
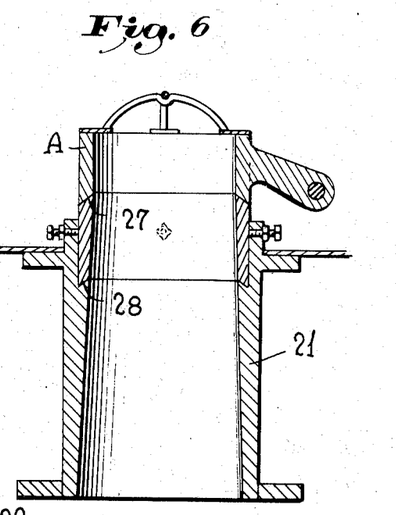
Fig. 6 is a similar view showing a different tip, of larger orifice area than that shown in Fig. 5, seated in operative position on an exhaust steam pipe.
Figures 7, 8:
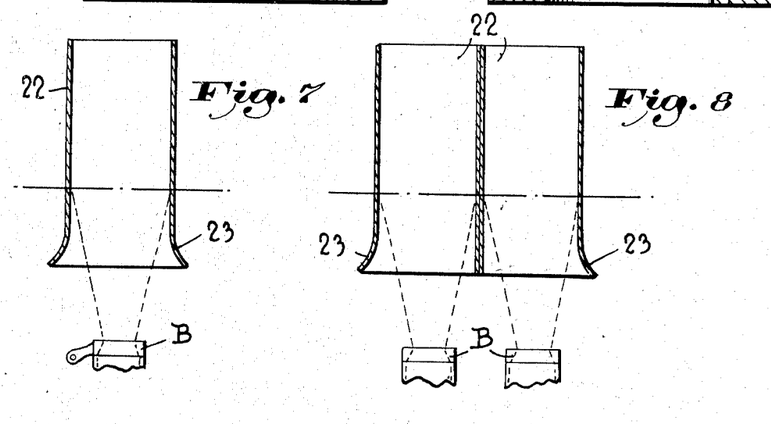
Fig. 7 is a vertical section through the stack, taken transversely of the smoke box, showing the jet form produced by the tip of Fig. 5.
Fig. 8 is a vertical section through the twin stacks, taken longitudinally of the smoke box, showing the jet forms from the cooperating twin steam exhaust pipes produced by tips like that shown in Fig. 5.
Figure 10:
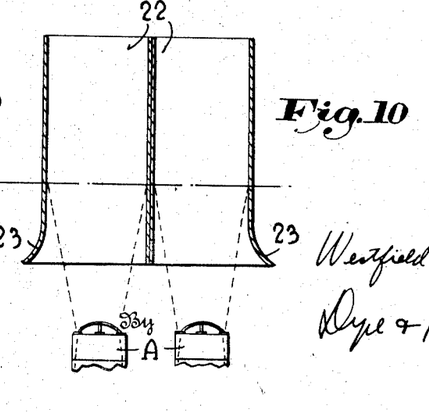
Fig. 10 is a view corresponding to Fig. 8 but showing the jet forms produced by tips that shown in Fig. 6.

Referring to the drawings, Fig. 2 shows, in horizontal section at 20, portions of the smoke box shell of a locomotive having, in the illustrated instance, twin exhaust pipes 21 vertically aligned beneath smoke stacks 22 each having a flaring stack extension 23 (Figs. 8 and 10). As best shown in Figs. 5 and 6, each pipe 21 is counterbored from its upper end to receive a liner 24 held in place by a series of set screws 25 just above the table plate 26 which extends horizontally across the smoke box and is shown broken away in Fig. 2. Each liner is provided with a machined terminal seat 27 at its upper end, which is best made conical, and the fit between the lower end of each liner and the bottom of the counterbore in the pipe is also preferably made by complemental conical surfaces, that of the liner being approximately parallel with the seat 27, to form the joint 28. It will be apparent that with this construction there will be little or no tendency for steam exhausted through the pipes to enter the joint 28.

At this point it is to be noted that herein and in the appended claims the expression "exhaust steam pipe" or its equivalent is used to designate the entire structure constituting the confined passageway for exhaust steam in the smoke box up to but excluding the removable tips which have been referred to hereinabove and which will be hereinafter described in detail, and including all extensions, liners, nozzles and the like which may be formed on the pipes per se. Similarly, the "exhaust steam pipe terminal seat" or equivalent expression means the seat at the outlet end of the confined passageway for exhaust steam in the smoke box on to which the tips are applied. Preferably such seat is a well defined area, best made as a smooth, ground surface, but such is not absolutely required and hence the terminal seat is to be understood as comprising broadly that part or area of the exhaust steam pipe (defined above) on which a movable tip comes to rest in operative position. Similarly, the "cooperating seat" formed on the tip is not necessarily a definite or ground area of the tip, but is broadly that part or area of the tip which rests on the exhaust steam pipe when the tip is in operative position.

Secured on the table plate 26 in a generally rectangular arrangement around the exhaust pipes is a set of bearings for four rock shafts. These include a double, crossed bearing 29 at each corner of the rectangle and an intermediate or spacer bearing 30 on each side of the space between the two exhaust pipes. A rock shaft 31 is journaled in the aligned bearings along one side of the rectangle, and a similar rock shaft 32 is journaled in the aligned bearings along the opposite side. Both of these shafts extend through the front wall of the smoke box where they are journaled in suitable bearings 33. Similar rock shafts 34 and 35 extend transversely of the smoke box at the forward and rear ends respectively of the rectangle, through the corner double bearings, one of these rock shafts extending through the left hand wall of the smoke box and the other through the right. At their crossings in the double bearings the shafts 34 and 35 pass under the shafts 31 and 32.

Keyed or otherwise rigidly mounted on the shaft 31 by means of arms 36 are two exhaust pipe caps or tips A, here shown as of the basket bridge type, and similarly mounted on the shaft 32 by arms 37 are two exhaust pipe caps or tips B, illustrated as of the Goodfellow type. Each tip is opposite one of the exhaust pipes and is provided with a ground seat complemental to the pipe seat 27, and the radial length of each arm 36, 37 from the axis of its shaft 31, 32 is such that when the shafts are rotated the tips A or B will swing in pairs to seat on their respective exhaust pipes or will be retracted to a position some 30° beyond the vertical. Thus the tips are designed to swing through approximately 120°, between substantially horizontal seating position and a fully retracted position of about 30° past vertical. For clarity of illustration the tips are shown in Fig. 2 as retracted to a position 90° beyond the vertical, but actually they do not swing to such a limit.

Each of the rock shafts 34, 35 similarly mounts the arm 38 of a tip C, illustrated here as of the open type. These tips swing on rotation of their respective rock shafts in precisely the same way as do the tips A and B, between seated position on the exhaust pipes and a retracted position of some 30° past vertical. They are shown, for clarity of illustration, as retracted to a horizontal position which actually they never reach.

The end of each rock shaft which projects from the smoke box shell carries a crank arm 39 connected by a link 40 with the rod 41 of a piston 42 which works in a fluid pressure cylinder mounted on the outside of the smoke box shell. Cylinder 43 contains the piston which is linked to the crank of shaft 31 for tips A, cylinder 44 contains the piston which is linked to the crank of shaft 32 for tips B, and two cylinders 45 contain the pistons which are linked to the cranks of shafts 34 and 35 for tips C.

Each of the pistons is movable by fluid pressure in its cylinder to rock its shaft to apply and retract its tips A or B or its tip C. As shown in Fig. 2 all the pistons are in the position which they assume when their tips are retracted. It will be evident that since the cranks 39 of the shafts 31 and 32 are depending as viewed in Fig. 2, and since the cranks 39 of the shafts 34 and 35 are upstanding, movement of any piston outwardly toward the head end of its cylinder will rock its shaft to apply the tip or the pair of tips carried by such shaft.

In Fig. 2 it is assumed that no fluid pressure is acting beneath any of the pistons, so that they are all urged to tip-retracting position by the tension of springs 46 coiled about the piston rods 41 and reacting between the lower end of each cylinder and a collar abutment 47 fixed on each piston rod. A tubular spring housing 48 encloses each of the springs 46 and extends from the bottom end of each cylinder, to which it is welded or otherwise made fast. Each piston rod extends through the bottom end of its cylinder and into the spring housing 48 by a loose fit in an opening in the cylinder bottom, so that fluid pressure in the cylinder below the piston passes freely into the spring housing. To confine this pressure a stuffing box 49 is capped over the outer end of each spring housing and consists of the customary gland nut 50 and ferrule 51 compressing packing 52 about the piston rod 41 and against a cap 53 threaded onto the spring housing 48, as shown in detail in Fig. 4. A small cushion spring 54 may be disposed around each piston rod, below its piston 42.

Near the bottom end of each cylinder is an inlet port through which fluid under pressure, air in the present case, may be admitted to move the piston toward the head end of the cylinder to apply the corresponding tip or pair of tips. Admission of air is controlled by magnet valves interposed in the air line anterior to each of the cylinders in an arrangement which will now be described.

A pressure line 60 extends from the main air reservoir 61 of the locomotive to two branches 62 and 63. Nipples 64, four in number, connect one or another of these branches with each of four magnet valves 65, 66 and 67, 67, all of which are alike and one of which is shown in detail in Fig. 3, which in turn are connected with the inlet ports of the cylinders 43, 44, and 45, 45 by nipples 68, 69 and 70, 70. Since air is always under pressure in the nipples 64, the open or closed condition of the several magnet valves controls the pressure in the inlet port nipples 68, 69 and 70 and determines which of the cylinders 43, 44 and 45 is supplied with air under pressure to move the piston therein to apply the tips A, B or C. It will be understood that when air is admitted to a cylinder inlet port the piston in such cylinder moves toward the head end, compressing the spring 46 and rocking the corresponding shaft 31, 32, 34 or 35 to apply tips A, B or C to the exhaust steam pipes 21.

As shown, tips A and B will be used selectively in applied position under all except abnormal conditions, so that the ordinary shifting of tips is from A to B and from B to A. Under some conditions of operation, shifting will be frequent.

It is desirable that the shift be made quickly, with, however, assurance that a tip which is being retracted will be clear of the exhaust steam pipe and out of the path of a tip which is moving to applied position before the latter tip advances far enough to interfere with the movement of the former. I accomplish this purpose by the cross connecting air pipes 71 and 72, best shown at the top of Fig. 2.

The pipe 71 branches from inlet port supply nipple 68 for cylinder 43 to the head end of cylinder 44, and the pipe 72 similarly branches from inlet port supply nipple 69 for cylinder 44 to the head end of cylinder 43. Obviously each of these pipes receives air pressure simultaneously with its nipple 68 or 69, responsive to opening of the magnet valve 65 or 66. The resulting action can be understood by assuming that only magnet valve 65 is open, so that pressure is in nipple 68, in cylinder 43 below the piston, in pipe 71, and in cylinder 44 above the piston. The piston in cylinder 43 will have moved toward the head end and tips A will be in applied position. The piston in cylinder 44 will be at the lower end of the cylinder and tips B will be in retracted position. Spring 46 of cylinder 43 will be compressed, and spring 46 of cylinder 44 will be expanded. Now if tips A and B are to be interchanged, magnet valve 65 will be operated to close off its supply nipple 64 and exhaust, through its nipple 68, the air in cylinder 43 beneath the piston therein and simultaneously exhaust the air in cylinder 44 above the piston, through pipe 71 and nipple 68. Simultaneously magnet valve 66 may be operated to open up its supply nipple 64 and admit air under pressure to the nipple 69. Let it be supposed that the operating of the two magnet valves occurs simultaneously, or with no significant or appreciable time lag. By the construction and arrangement which I have provided the retraction of the applied tip and the application of the retracted tip take place in sequence, so that interference or contact of the tips with each other cannot occur. Thus, when valve 65 exhausts, the piston in cylinder 43 is quickly moved to the left in Fig. 2 by the expansion of its spring 46, and if valve 66 is open, this movement of the piston is aided by air under pressure in nipple 69 and pipe 72. Movement of the piston in cylinder 44, however, toward the head end of that cylinder proceeds more slowly because the sole force producing such movement is air under pressure in nipple 69, and this force acts in opposition to the tension of spring 46 of cylinder 44. Hence the piston in cylinder 44 is slow to move toward the head of the cylinder, while the piston in cylinder 43 is quick to move, even assuming that both valves 65 and 66 are operated together. The piston in cylinder 44 moves only when air pressure beneath it builds up to overbalance its spring 46, while the piston in cylinder 43 moves instantly, on the exhausting of valve 65, due to the additive forces of spring tension and air pressure.

Of course the operation is similar, but reversed with respect to the movement of the particular parts, when tips B are in applied position and are to be retracted and tips A are to be applied, as will be understood.

The magnet valves 65, 66 and 67 may all be of similar and well known construction. One of them is shown in detail in Fig. 3 and comprises a casing having a pressure chamber 80 connected to the air pressure line and an exhaust chamber 81 vented to the atmosphere by a series of exhaust ports 82. Rigidly connected oppositely opening valves 83 and 84 are seated in these respective chambers and form an extension of the core 85 of a coil 86. The arrangement is such that one of the two valves is always seated when the other is unseated, and a spring 87, reacting between valve 83 and an adjustment plug 88 keeps pressure supply valve 83 normally seated. Binding posts 89 constitute the terminals of the coil, and it will be evident that when the coil is energized the core will be depressed to open valve 83 against the tension of spring 87 and place operating cylinder supply nipple 68 in connection with pressure line nipple 64. When the coil is deenergized the spring 87 moves the valve 83 to its seat and opens valve 84, thus closing off the supply of pressure from the line to the nipple 68 and venting the air from nipple 68 through the exhaust ports 82.

A button 90 may be provided in the top of the valve casing for manually opening valve 83 and closing valve 84, this button being urged upwardly by a coil spring 91 against the tension of which it may be depressed to swing a lever 92 into depressing engagement with the core 85.

Figure 1:
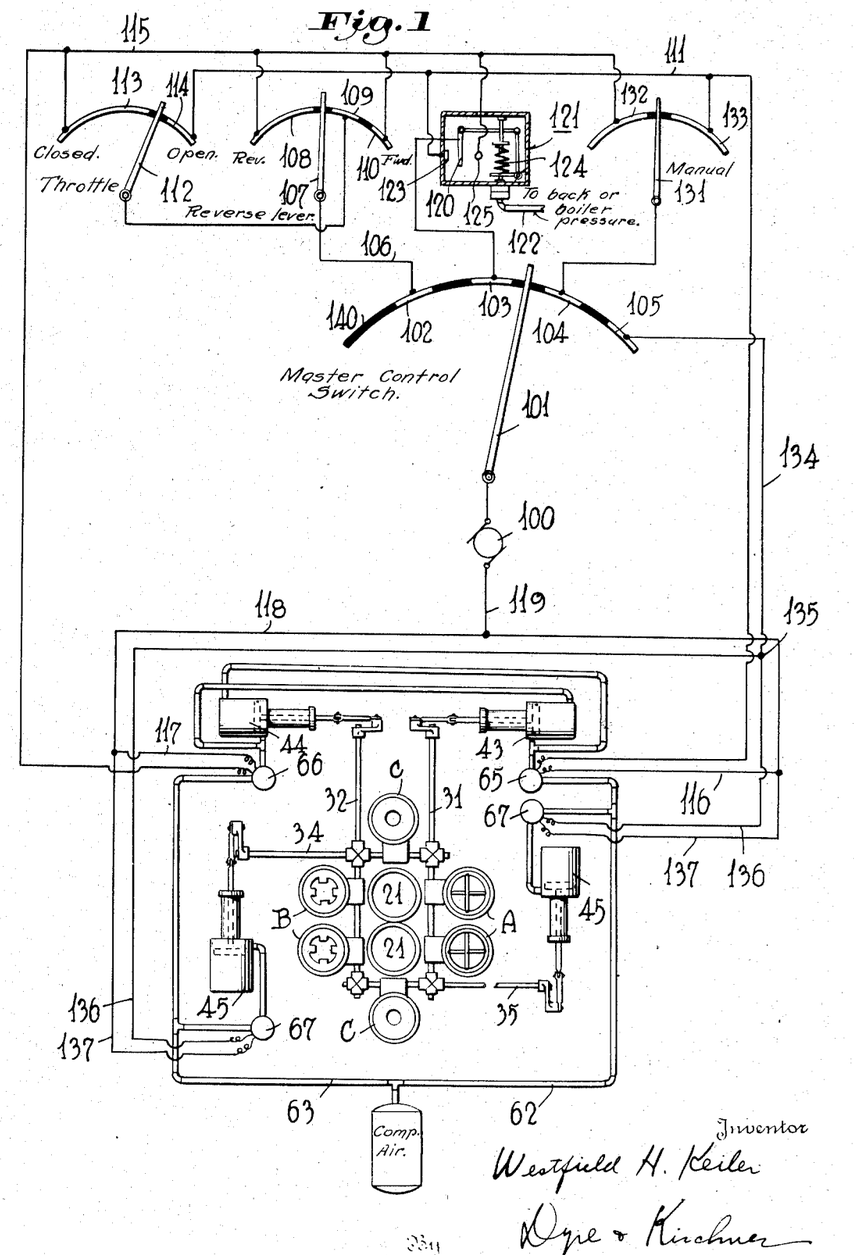
Figure 1 is a diagrammatic view of a set of three interchangeable tips mounted for selective application to each of twin exhaust pipes, together with an electric circuit for controlling the movement of the tips.

Operation of the several magnet valves selectively to interchange the several tips A, B and C is effected by the control circuit illustrated diagrammatically in Fig. 1. This circuit is arranged for operation of the valves automatically responsive to operating conditions encountered en route, or manually at the option of the engineer.

The source of current supply for the circuit may be the usual steam turbine driven generator 100 of the locomotive. One lead from the generator is connected to the handle 101 of a master control switch which works across a quadrant having contacts 102, 103, 104 and 105 spaced by insulation blocks. The contact 102 is connected by lead 106 to a switch-handle 107 which may form part of or be connected to the reverse lever so as to move therewith. This switch handle 107 moves across a quadrant having contact 108, 109 and 110 separated by insulation blocks so proportioned that the contact 108 extends across substantially one half of the quadrant traversed by the reverse lever during movement from full reverse position to substantially neutral, while contacts 109 and 110 with their intervening block of insulation extend across that segment of the quadrant over which the reverse lever moves between neutral and full forward position. At neutral position of the reverse lever the handle 107 engages the insulation block between the contacts 108 and 109.

The contacts 108 and 110 are connected directly to a main lead 115 and the contact 109 is connected directly to switch handle 112 which forms part of or is connected to the throttle so as to move therewith across a quadrant coextensive with the throttle quadrant and including contacts 113 and 114 separated by an insulation block. The proportions of these contacts are such that contact 113 extends continuously from full closed position of the throttle somewhat more than one half toward full open position, while contact 114 extends across the balance of the quadrant from the insulation block between the two contacts to the open end of the quadrant. Contact 113 is directly connected to main lead 115 and contact 114 is directly connected to a second main lead 111.

The main leads 111 and 115 extend respectively to one of the binding posts of the magnet valves 65 and 66. The other binding post of each of these valves is connected by a branch 116 and 117 respectively of a return conductor 118 which is connected by the lead 119 to the other pole of the generator.

Contact 103 of the master control switch is connected to the circuit changing arm 120 of a pressure actuated switch 121, conveniently one of the sylphon type, the inlet pipe 122 of which receives steam under pressure directly from the boiler or from the steam cylinder exhaust passages so that the position of arm 120 is responsive to boiler pressure or exhaust back pressure. This switch is shown in detail in Fig. 16 and will be more particularly described hereinafter, but it will be sufficient here to explain that pressure in the inlet pipe 122 will swing arm 120, which is connected to master control switch contact 103, into engagement with contact 123 when pressure in the line 122 is high, while the tension of spring 124 will move the arm 120 into engagement with a contact 125 when the pressure in the pipe 122 is low. The contact 123 is directly connected to main lead 111 and the contact 125 is directly connected to main lead 115.

Contact 104 of the master control switch is connected to the handle 131 of a manual switch which moves across a quadrant having a contact 132 directly connected to main lead 115 and a contact 133 directly connected to main lead 111. These two contacts are separated by an insulation block and they may be symmetrically disposed on the quadrant in such a fashion that they are of equal length with the insulation block occupying the mid-portion of the quadrant.

Contact 105 of the master control switch is directly connected to a lead 134 which branches at a junction 135 into two leads 136 each of which is connected to one of the binding posts of each magnet valve 67. The other binding post of each valve is connected by a lead 137 to the main return lead 118.

The operation of the control system is as follows:

If the engineer wishes to make the selection of tips A and B automatically responsive to the position of the reverse lever and throttle he swings master control switch lever 101 on to contact 102. If the reverse lever is in position to produce a relatively short stroke of the steam valves for forward operation of the locomotive, the switch handle 107 will be engaged with contact 109, and if the throttle is closed or only moderately open a circuit will be completed from the generator 100 through conductors 101, 102, 106, 107, 109, 112, 113 and 115, magnet valve 66 and conductors 117, 118 and 119 back to the generator. Magnet valve 66 being thus energized, tips B will be held in applied position on the exhaust pipes. If however the throttle is moved farther toward full open position switch handle 112 will be engaged with contact 114, which will substitute main lead 111 for main lead 115 in the circuit which has just been described, so that magnet valve 65 will be energized to apply tips A to the exhaust steam pipes. Obviously movement of the throttle to swing switch handle 112 from contact 113 to contact 114 or vice versa will result in prompt interchange of the tips B and A.

If however the reverse lever is in such position that the steam valves are set for reverse operation, or for a comparatively long stroke for forward operation, one or another of contacts 108, 110 will be energized by handle 107. Both of these contacts put main lead 115 into the circuit to energize magnet valve 66 and apply tips B. It will be observed that this application is made for all reverse operation settings of the reverse lever and for long stroke forward operation settings, regardless of the position of the throttle.

If the engineer wishes to make tip selection responsive to boiler pressure or exhaust back pressure, he swings master control switch handle 101 to engage contact 103. The circuit will then be traced through contacts 123 or 125 and main lead 111 or 115, depending on pressure in the line 122, to apply tips A or tips B.

Under certain emergency or other conditions the engineer may desire to apply a tip other than that which would be applied automatically in response to current operating conditions. In such case he moves master control switch handle 101 to engage contact 104 and then he selects contact 132 or 133 to be engaged by manual switch handle 131. It will be noted that when this switch handle is engaged with contact 132 main lead 115 becomes energized to apply tips B, while main lead 111 becomes energized to apply tips A if contact 133 is engaged by switch handle 131.

Under certain unusual conditions the engineer will desire to apply tips C. In such case he swings master control switch handle 101 into engagement with contact 105. This has the effect of energizing conductor 134 and its branches 136 so as to energize both of the magnet valves 67. These magnet valves admit air pressure beneath the pistons in the cylinders 45 simultaneously so as independently to apply both of the tips C to the exhaust steam pipes.

Of course the system is rendered inoperative if the master control switch handle engages any of the several insulation blocks on its quadrant. It is convenient to position a relatively long insulation block at 140 at one extreme end of the master control switch quadrant so that the handle 101 may be readily swung to such extreme end whenever it is desired to render the electrical control system inoperative.

Figures 16, 17:
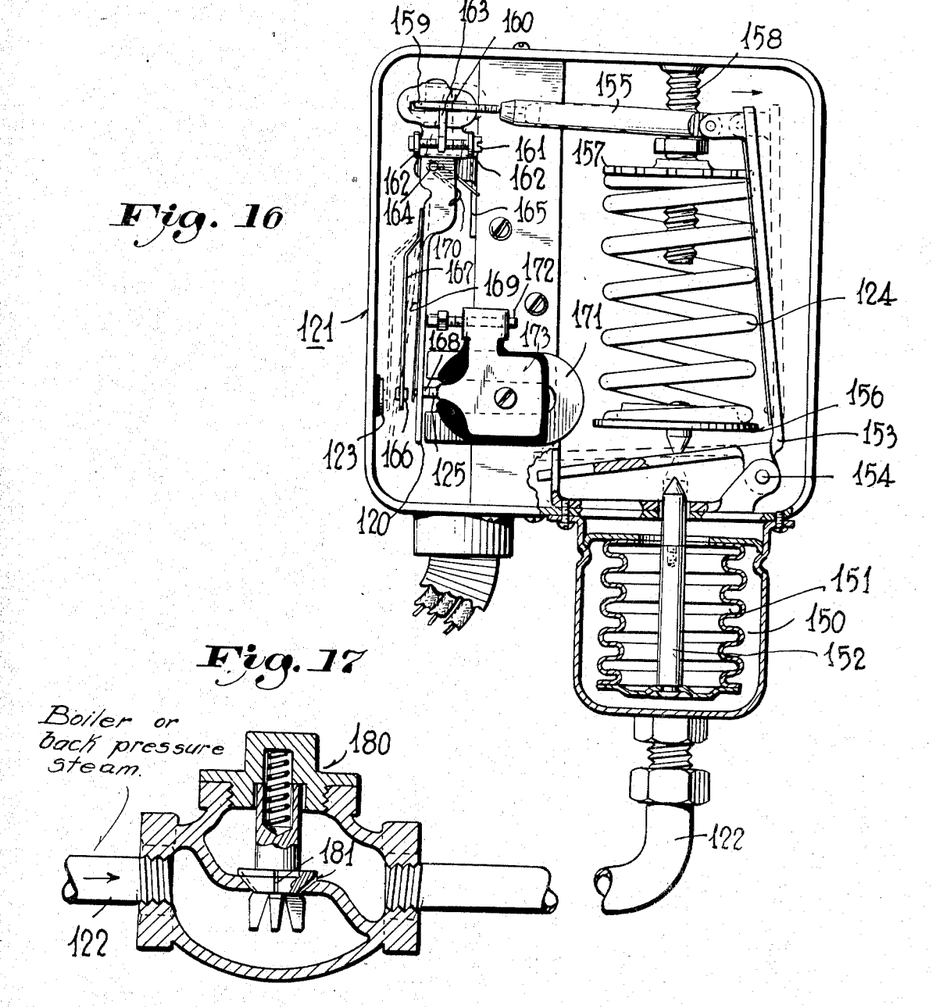
Fig. 16 is a side elevational view, with the front cover removed, of a type of pressure actuated switch which may be used in the system depicted in Fig. 1.
Fig. 17 is a cross sectional view of a check valve which is interposed in the line supplying steam pressure to the switch of Fig. 16. The relationship between Figs. 16 and 17 is that which is actually employed for the parts shown in these figures.

Certain details of the pressure actuated switch 121 and of its pressure line connections will now be explained. The pipe 122 supplies steam pressure to the closed space 150 surrounding a bellows 151 which elevates pin 152 in proportion to the steam pressure, since the space above the bellows is open to the atmosphere. At a predetermined pressure value the terminal point of the pin begins to rock bell crank lever 153 about its pivot 154 to pull link 155. This movement is resisted by the tension of spring 124 reacting between a bottom cap 156 which bears on the lower arm of the bell crank lever and an upper cap 157 which is adjustably threaded on an instanding screw 158 more or less aligned with the pin 152. The link 155 has a terminal hook 159 which makes a loose or lost motion connection in the slot 160 in the upper end of the switch arm 120. The degree of looseness or the amount of lost motion is adjustable by a screw 161 which is journaled in ears 162 struck out from the arm 120 just below the slot 160 and moves a nut arm 163 to vary the effective length of the slot in which the hook 159 travels. The switch arm 120 is pivoted at 164 just below the ears 162 in a bracket 165 fixed in the casing of the switch 121. A movable contact 166 is mounted on a leaf spring 167 riveted to the switch arm 120, and another movable contact 168 is mounted on another leaf spring 169 similarly fixed to the switch arm. A coil spring 170 wound about the pivot 164 and reacting between the arm 120 and the bracket 165 urges the arm to swing clockwise as viewed in Fig. 16 to close contact 166 against fixed contact 123 mounted in the casing, while a small permanent magnet 171 exerts its attractive force on the arm 120, which is made of ferrous metal, to close contact 168 with fixed contact 125 mounted in the casing. A limiting screw 172 is adjustable in a bracket 173 fixed on the magnet so that the extent to which the arm 120 can approach the magnet poles can be adjusted. Three electric leads extend from the casing of the switch 121, one connecting the switch arm 120 with master control switch contact 103, another connecting fixed contact 123 with main lead 111, and the third connecting fixed contact 125 with main lead 115. The operation of the switch 121 is as follows:

Assuming that the pipe 122 is connected to the exhaust cavities of the engine or otherwise so as to conduct exhaust back pressure to the space 150 surrounding the bellows 151, the spring 124 will be selected, and the cap 157 and the nut arm 163 will be adjusted, to cause switch arm 120 to swing clockwise to close contacts 166 and 123 when the exhaust back pressure rises to a predetermined value. As has been explained, this will have the effect of appropriately shifting the exhaust pipe tips, as by substituting tips A for tips B on the pipes. The breaking and making of the contacts by the switch arm 120 will take place by a sort of snap action, inasmuch as the arm will swing suddenly in the clockwise direction as soon as the link 155 has pulled the arm 120 sufficiently for the attractive force of the magnet 171 for the switch arm 120 to be overcome by the torsion of pivot spring 170. Should the back pressure in the line 122 subsequently fall to a value predetermined by the setting of the adjustments, link 155 will move to the left to push arm 120 counterclockwise sufficiently against the torsion of spring 170 for the field of magnet 171 to assert itself, and the arm 120 will snap contacts 168 and 125 into engagement to reapply tips B on the exhaust pipes.

If the pipe 122 is connected to the boiler, so that tip selection becomes responsive to boiler pressure rather than to exhaust back pressure, appropriate adjustments are made in the switch 121 and a considerably stouter spring, or a pair of concentric springs, is substituted for the spring 124, the action of the parts proceeding in the same way as has been described.

A very obvious modification of the control system comprises employing two pressure actuated switches 121 one connected to the exhaust cavities or the like of the engine so as to make such switch operable by exhaust back pressure, and the other connected to the boiler so as to make that switch operable by steam pressure. In such modification the master control switch will have an additional contact 103, and each of the two contacts 103 will be connected to one of the switches 121. In this way, at the option of the engineer the selection of tips can be made responsive to exhaust back pressure or boiler pressure. In order to avoid unnecessary complication of the drawings, and because the suggested duplication of switch 121 is so obviously possible if thought desirable, only one switch 121 has been shown in Fig. 1.

It will be evident that when exhaust back pressure is the controlling medium applied to the bellows 151, the pressure will fall abruptly at the moment of tip shifting in response to high back pressure, because at that moment neither of the tips A or B is positioned on the exhaust steam pipes and back pressure is therefore greatly reduced. Special means is necessary to make the shifting proceed as required by the high back pressure that initiated the shift, and to prevent the sudden fall in back pressure from operating to restore to the exhaust steam pipes the tips that caused the rise in back pressure. This means may take the form of a check valve 180 so positioned in the line 122 that pressure transmitted to the bellows 151 will be trapped and maintained in the space 150 surrounding the bellows long enough to allow the shift of tips to be completed. Such a valve is shown in Fig. 17, and the relation of this figure with Fig. 16 indicates how the valve is connected in the line 122.

It will be recognized that as soon as switch 121 has operated in response to high back pressure to substitute tips A for tips B on the exhaust steam pipes, back pressure in such pipes falls off, so that the pressure on the bellows 151 is a false one, being higher than the actual back pressure. It is necessary to make the pressure on the bellows the same as the actual back pressure, i. e., to equalize the pressures in the line 122 on opposite sides of the check valve 180. This is accomplished by having a few shallow slots, as shown at 181, cut in the plug or other movable part of the valve, or in the seat therefor, so that the valve leaks sufficiently to equalize its front and rear pressures after some suitable lapse of time, say fifteen seconds. I have used successfully a conventional type of check valve like that shown in Fig. 17 with a few slight notches filed in its plug. The notches 181 shown in the figure are exaggerated for clarity of illustration.

Certain mechanical details of the tips and their mountings, by which defects and deficiencies of previous attempts to provide for selective application of plural tips en route are obviated, are important and will now be explained. By reference to Figs. 5 and 6 it will be observed that the seat 27 is conical so that there is little or no tendency for steam which is being exhausted through the pipe 21 and liner 24 to enter this joint. Since the joint is maintained by yieldable constant pressure (preferably air pressure as has been explained) the joint is automatically kept steamtight despite wear of the seats, bearings, etc. This is important because the exhaust steam contains vaporized lubricating oil which the heat of the pipes, tips and associated metal parts tends to carbonize. By maintaining the joint at the seat 27 steamtight, carbonization in this joint and consequent impairment of the form and volume of the jet is eliminated.

Figure 9:
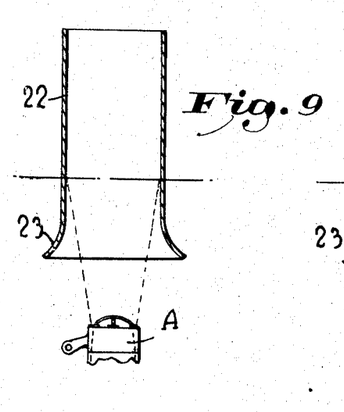
Fig. 9 is a view corresponding to Fig. 7 but showing the jet form produced by the tip of Fig. 6.

Of course the several tips are shaped to provide different orifice areas. In the illustrated embodiment the tips A are of larger orifice area than the tips B. That is to say, the perimetric lips which bound the outlet openings in the tips A and B, and therefore define the orifices of the tips, are of different length, in the illustrated embodiments of the invention the perimetric length of the lips of tips B being shorter than that of the lips of tips A. It is desirable to maintain the impingement level of the steam in the stack or stack extension substantially the same regardless of which of the interchangeable tips are used in operative position, since some particular impingement level is most efficient for good drafting in any given locomotive. A difficulty with the interchangeable orifice areas of the tips or nozzles of the prior art is that change in orifice area altered the impingement level so that it was never, or at least not always, at the zone of maximum drafting efficiency. I avoid substantial deviation from a constant, fixed impingement level by appropriately proportioning the heights of the several tips. Thus, as best appears by a comparison of Figs. 5 and 6, the tip which is of smaller orifice area, and therefore produces a jet of smaller diameter, is made lower than the tip which is larger orifice area and produces a jet of larger diameter. From this relationship it results that the expanding, substantially conical jets originate at different distances below the stack, the jet of larger diameter originating closer to the stack than the jet of smaller diameter. Consequently both jets will have expanded to fill the stack or stack extension, these two parts together being called the stack passage in the appended claims, at substantially the same elevation therein, and thus the impingement levels of the two jets are maintained approximately the same. In practice each installation is proportioned to make this substantially constant impingement level coincide with a predetermined level of maximum efficiency. A comparison of Figs. 7 and 8 with Figs. 9 and 10 shows the larger diameter jets from tips A originating closer to the stack passage than the smaller diameter jets from tips B, so that expansion of these two jets sufficiently to fill the stack passage will take place in just enough distance to make their impingement levels approximately the same. Of course tips C are proportioned in accordance with this same principle, so as to give them substantially the same impingement level as tips A and B.

Before proceeding to a discussion of certain mechanical modifications of the operating arrangement for effecting shifting of the tips, it is appropriate to explain how the selectively applicable tips may be employed under various conditions and how they have materially improved locomotive performance and reduced fuel and water consumption, as well as fire cleaning expense and other cost items in several actual installations.

It will be assumed that the orifice area of tips A is largest, that of tips B is smaller, and that of tips C is still smaller. When the locomotive is laboring, as in starting or ascending a grade, master control switch handle 101 will be moved to engage contact 102 and switch handle 107 (which may be regarded as the reverse lever since it moves therewith) will be moved to full forward position, engaging contact 110 to apply tips B which, having comparatively small orifice areas, increase the velocity of the exhaust steam into the stack and produce good draft despite the infrequency of the exhaust blasts consequent upon the slow speed operation of the laboring engine. As speed increases the reverse lever will be moved back to shorten the valve stroke, becoming engaged with contact 109. If the throttle (which may be regarded as the switch handle 112 since that handle moves with the throttle) is only moderately open, being therefore engaged with contact 113, tips B will remain applied and good draft will be maintained as will be required by the comparatively small quantities of steam being exhausted. If, however, the throttle is wide open or nearly so, switch handle 112 will be engaged with contact 114 and tips A will be applied. Tips A, being of larger orifice area than tips B, serve to reduce back exhaust pressure, but good draft will be maintained because the quantities of steam exhausted will be relatively great and will not have to be exhausted at high velocity.

Thus this phase of the automatic operation made possible by the invention results in application of that one of the selective tips or those of the pairs of similar tips which will maintain adequate draft in accordance with the volume of steam being exhausted per unit time and will keep back pressure low when such volume increases to a quantity that will produce adequate draft without maintaining high exhaust velocity with objectionable increase in back pressure.

If the engineer at any time wishes to make tip selection automatically responsive to boiler pressure or exhaust back pressure (whichever is conducted by pipe 122 to switch 121) he moves master control switch handle 101 into engagement with contact 103, and thereupon tips A become applied to reduce exhaust back pressure if such pressure is already too high or if boiler pressure is high, or tips B will become applied to increase draft if the exhaust back pressure or the boiler pressure is low. It is believed that the operation of the switch 121 will be understood from the detailed disclosure of this switch hereinabove and in Fig. 16.

The manual switch 131 can be made operative at the option of the engineer at any time by moving master control switch handle 101 to engage contact 104. This will be done principally in case of some emergency, such as upon the occurrence of some mechanical defect or breakdown which would adversely affect the steaming qualities of the engine. For example, in the case of leaky or burst units or flues, or of serious steam leaks in the front end, the engineer can cut out the automatic control and employ the manual control to apply tips B under conditions where the automatic control would result in application of tips A. In this way increased draft will be obtained to compensate, in part at least, for abnormal steam losses.

Tips C as shown are of smaller orifice area than either of tips A or B. The principal use of such tips is for fire cleaning, as in the following example:

It is not uncommon for an engine run to be limited by the necessity of stopping to clean the fire after the accumulation in the ash pan rises to such a point that insufficient air is admitted through the grates to maintain adequate combustion. If tips C are applied from time to time as ashes accumulate on the fire, the extraordinarily strong draft produced by these tips will draw most of these ashes out through the stack so that it will not be necessary to shake the fire to deposit the ashes in the ash pan. In this way a clean fire and a low level of ashes in the pan can be maintained and it will not be necessary to stop the engine to dump the pan.

It is not essential to the invention that tips C be of smaller orifice area than tips A and B. In one form of the invention tips C will be of larger orifice area. In such case, prescribed for certain types of locomotives in certain kinds of service, the unusually large orifice area of tips C will reduce exhaust back pressure at very high speeds further even than it can be reduced by tips A in the arrangement shown by the present drawings. The following example of one mode of using this alternative arrangement may be given:

Suppose a very heavy type locomotive is used in both passenger and freight service over a right of way which includes heavy grades. In passenger service tips B would be applied when starting and while ascending grades at slow speed. However, as the speed increases, back pressure rises as long as the throttle is wide open or nearly so; hence tips A will then be applied. At extremely high speeds with the throttle wide open or nearly so, back pressure becomes excessive even with tips A applied, and under these conditions tips C, modified from the illustrated form to have very large orifice areas, will be applied. If the same locomotive is used in heavy fast freight service which requires the locomotive to be worked at or near its maximum capacity throughout a great part of its run, tips B would be applied when starting and up to a predetermined speed, whereupon tips A will be applied. But when the speed increases to a very high rate, the engine being worked at such time at or near its maximum capacity, back pressure rises objectionably even with tips A applied and good draft can be maintained by the large volume of exhaust and the rapid rate thereof with orifice areas larger even than those of tips A. Under such conditions adequate exhaust velocity and consequently adequate draft will be provided by applying modified tips C, and back pressure will be materially reduced. Of course, if at any time the drafting qualities of the engine should fall off with such tips C applied, either of tips A or B can be substituted on the exhaust steam pipes.

It may sometimes happen that pressure in the main reservoir 61 or in the supply lines therefrom to the tip-shifting cylinders will fail for one reason or another. To protect the system against such an emergency, I prefer to connect a pressure gauge line 140 separately to each of the cylinders 43 and 44 and jointly to the cylinders 45, below the piston in each, and mount gauges (not shown) in the cab for showing at all times the pressure in these several cylinders. If the engineer observes that adequate pressure is not being maintained to operate the pistons to shift the tips or to hold an applied tip on its seat in steamtight relation therewith against exhaust steam pressure, he can mechanically clamp any set of tips in applied position by means of clamping screws 141 threaded in brackets 142 mounted on the exterior of the smoke box shell adjacent to the path of travel of the several crank arms 39. Normally these screws are so adjusted in their brackets that the crank arms clear them in their swing, but under emergency conditions they may be turned up (in the case of the screws for the crank arms associated with the pistons in cylinders 43 and 44) or down (in the case of the screws for the crank arms associated with the pistons in cylinders 45) to mechanically clamp a selected tip A or B or C in applied position and the locomotive can be continued in operation to its destination where proper repairs can be made and the air pressure control put back into operation.

Figure 11:
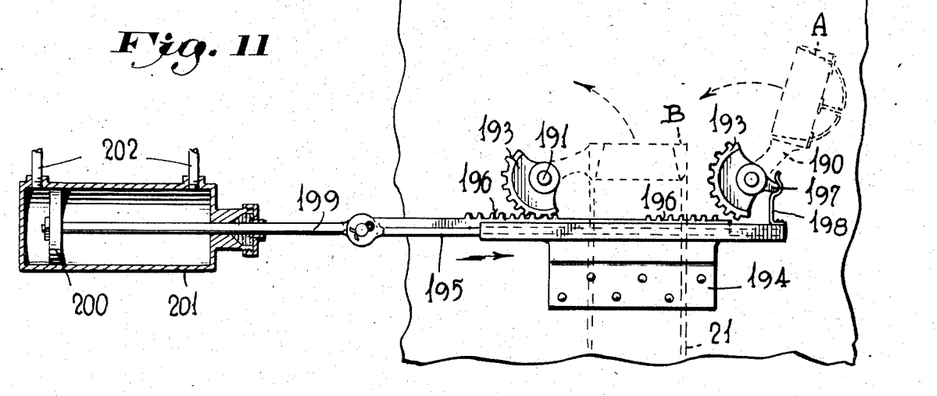
Fig. 11 is a schematic illustration of a modified form of the invention, the view being a side elevation of part of the smoke box casing with certain of the parts shown in longitudinal section.
Figures 12, 13:
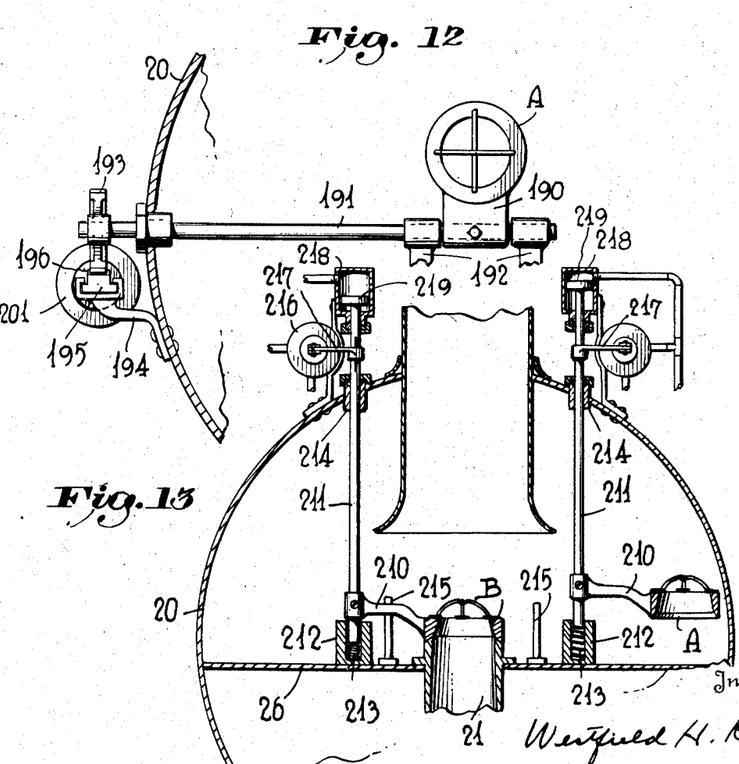
Fig. 12 is a vertical cross section of certain of the parts shown in Fig. 11.
Fig. 13 is a vertical cross section through a smoke box showing a still further modified form of the invention.

The shifting mechanism for the tips may be variously modified from the preferred arrangement which has been described above. For example, Figs. 11 and 12 depict a construction in which each one of a pair of tips A and B, which may be like the tips A and B heretofore described, is mounted by an integral arm 190 fast on a rock shaft 191 which is journaled in brackets 192 securely mounted in the smoke box, as on the exhaust steam pipes. Two such rock shafts are used, one for each of the arms 190, and one end of each projects through a side of the smoke box shell 20 in which it is suitably journaled. Fast on that end of each rock shaft which protrudes from the shell is a gear segment 193. A bracket 194 is riveted or otherwise secured to the outside of the smoke box shell and terminates in an integral guide slidably receiving a bar 195 having spaced rack portions 196. These rack portions are engageable with the gear segments 193 in such a way that reciprocation of the bar 195 in one direction to one limit of its movement will swing the tip A down on to the exhaust steam pipe 21 and simultaneously swing the tip B up into retracted position from the pipe, while movement of the bar to its limit in the reverse direction will oppositely dispose the tips. To maintain a retracted tip securely in retracted position, even though its gear segment be in such position disengaged from the cooperating rack portion 196, a lug 197 may be formed on the hub of the gear segment to engage and be caught by a spring detent arm 198 upstanding from the guide for the reciprocating bar.

It will be observed that in Fig. 11 only one lug 197 and only one spring detent arm 198 are used. The reason for this will be understood when it is observed that only one of the two gear segments becomes disengaged from its cooperating rack portion during reciprocation of the bar 195. Such disengagement provides a relatively small amount of lost motion between the bar and one of the gear segments, i. e., between the two rock shafts 191 and therefore between the two tips A and B. This lost motion insures clearance of one tip from the steam pipe before the other swings down into position on the pipe, i. e., it insures removal of a tip being retracted from the path of a tip that is to be applied, so that the moving tips will not interfere with each other. Reference to Fig. 11 will show that, when tip B is to be retracted and tip A is to be applied, the initial movement of bar 195 to the right will start the retraction of tip B appreciably before tip A begins to move toward applied position, because the gear segment for tip B is always meshed with its rack portion, while the bar has to move some distance before the gear segment for tip A becomes engaged with its rack portion. Thus movement of tip A toward applied position lags behind movement of tip B toward retracted position. However, from the time that both gear segments are meshed with the moving bar, they move at equal rates, and by the time tip A is in applied position, after swinging through say 120°, tip B has swung through more than 120°, say through 150°, so that it is in a more completely retracted position, so to speak, than that occupied by tip A at the beginning of the movement. But the gear segment for tip B remains meshed with its rack portion, even when tip B is in fully retracted position. Consequently when the bar 195 is again reciprocated, to apply tip B and retract tip A, both tips start moving together but tip B must swing through a longer arc to seat on the pipe 21 than that through which tip A swings to reach its fully retracted position with its gear segment freed from its rack portion and the lug 197 held by detent 198. Hence interference of the tips with each other during this phase of the movement is avoided.

One end of the bar 195 is connected to a piston rod 199 carrying a piston 200 working in a cylinder 201 mounted on the outer side of the smoke box shell. A pair of fluid pressure supply pipes 202 communicate with the opposite ends of the cylinder and with a suitable control valve, one form of which will be hereinafter described, so that pressure will be simultaneously admitted to one end of the cylinder and vented from the other end to reciprocate the bar 195 in one direction or the other selectively to apply and retract the tips A and B.

It will be noted that each tip, when it is retracted, is securely held against rattling or falling toward applied position, tip A being held retracted by the spring detent 198 and tip B being held retracted by fluid pressure above piston 200.

A further modification is illustrated by Fig. 13 in which tips A and B are provided with arms 210 each of which is made fast on a vertical shaft 211 the lower end of which is mounted in a step bearing 212 positioned on the table plate 26 and the upper end of which protrudes from the smoke box shell adjacent to the stack. A coil spring 213 in each step bearing normally urges the cooperating shaft upwardly, and a suitable bearing 214 supports the shaft in the upper part of the smoke box shell for reciprocation against the tension of spring 213 and for rotation. It will be obvious that if the tip B in Fig. 13 is elevated by expansion of the spring 213 and consequent upward movement of its shaft 211, and then swung by rotation of that shaft, the exhaust steam pipe 21 will be cleared and a tip A may be applied to it by rotation of its shaft 211 followed by downward thrust of that shaft against its spring 213. Suitable stops in the form of abutments 215 may be mounted on the table plate or elsewhere on a stationary part of the structure for limiting the swing of the arms 210 so that on their downward movement they will be guided to seat on the pipe 21.

To reciprocate and rotate the shafts 211 I mount fluid pressure cylinders adjacent to their upper ends which protrude from the smoke box near the stack. Each adjacent pair of these cylinders may be mounted on a common bracket secured on the smoke box shell. A fluid pressure cylinder 216 has its piston rod connected by a link to an arm 217 fast on each shaft 211 so that reciprocation of the piston will rotate the shaft. Another, but considerably smaller, cylinder 218 is mounted above the end of each rod and a piston in this cylinder is mounted on the end of the rod. Fluid pressure admitted to the cylinder 218 will thrust the rod downwardly against the tension of spring 213.

In operation air or other fluid under pressure is admitted simultaneously to the two cylinders 216 and 218 for a tip which is in retracted position from the pipe 21, such as the tip A in Fig. 13. At the same time air is admitted to the opposite side of the piston in the cylinder 216 which is associated with applied tip B and air is vented from above the piston 219 associated with this tip. In such case B tip shaft 211 is promptly lifted by spring 213 and rotated by its arm 217 to swing tip B clear of the pipe 21, while A tip shaft 211 is first rotated by its arm 217 and then thrust down against spring 213 to seat tip A on the pipe.

Proper sequence of lifting and swinging movement is made certain by so selecting the sizes of the cylinders 216 and 218 that when operating to apply a tip the piston in cylinder 216 will be moved through its whole stroke before the piston 219 moves down far enough against spring 213 to seat the tip on the pipe 21. It is easy to effect this arrangement because rotation of shaft 211 is resisted only by the inertia of the free swinging tip, while downward thrust of the shaft is resisted by the spring 213. Admission and venting of air for the cylinders 216 and 218 may be controlled by any suitable type of valve, one of which will be explained hereinafter.

Figure 14:
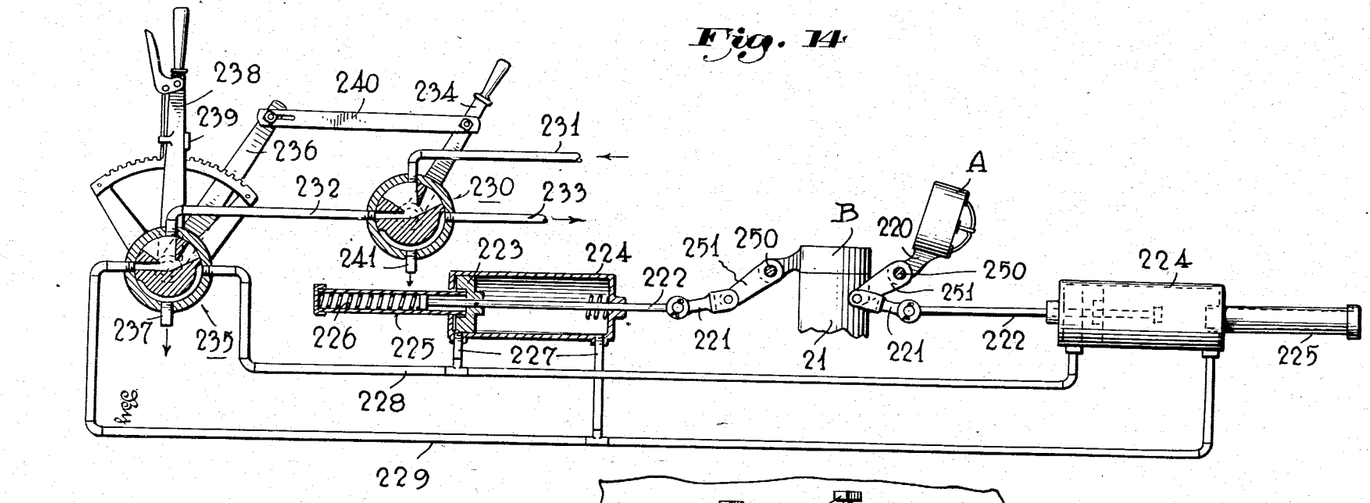
Fig. 14 is a schematic representation of another modification of the invention showing the use of fluid pressure controlling mechanically operated rotary valves substituted for the electrically operated valves of Figs. 1, 2 and 3.

Fig. 14 depicts a further modified arrangement. Tips A and B are pivotally mounted by their arms 220 on rock shafts 250 suitably positioned at opposite sides of the exhaust steam pipe 21. The outer ends of these rock shafts extend through the smoke box shell and are connected by arms 251 and links 221 to piston rods 222 carrying pistons 223 in cylinders 224 through the head ends of which the rods project into a tubular housing 225 containing a tension coil spring 226. The arrangement of cylinder, piston, rod, etc. is identical and opposite for each of the tips A and B. Each of the cylinders 224 is provided with end ports 227 connected to fluid pressure lines 228 and 229 respectively. It will be evident from Fig. 14 that admission of air or other fluid under pressure to one or another end of each of the cylinders 224 will apply or retract the tip A or B associated with such cylinder.

The arrangement for controlling the supply of fluid pressure to the several cylinders may consist of a first rotary valve 230 connected by a supply line 231 to the main air reservoir of the locomotive. The rotatable plug of the valve is suitably ported to direct fluid under pressure in the pipe 231 to a pipe 232 or a pipe 233, depending on the position of a handle 234. In the position shown in Fig. 14 the plug of the valve 230 is positioned for transmitting fluid under pressure to the line 232. This line supplies a second rotary valve 235, the ports of which are arranged to supply this pressure alternatively to one or another of the supply lines 228 and 229 for the several cylinders 224. With the valve 235 in the position shown in Fig. 14 pressure is supplied to the line 229 for applying tip B to the pipe 21 by moving to the left the piston 223 in the cylinder 224 for such tip, compressing its spring 226. It will be observed that this same line 229 supplies pressure to the cylinder 224 for tip A to retract that tip. The valve 235 is provided with a handle 236 by which it may be rotated to cause its ports to cut line 229 off from the air pressure supply and connect that supply with line 228. In such case the two tips will be reversely operated, as will be understood from the figure. A vent port 237 is arranged in the valve 235 to vent that one of the lines 228, 229 which is not being supplied with pressure.

The handle 236 may be mounted in such relation to the reverse lever 238 that it will be engaged and moved by a lug or arm 239 on the reverse lever to the right in Fig. 14 to supply pressure to the line 228 and vent the line 229 when the reverse lever is moved to or nearly to full forward position. A spring (not shown) associated with the plug of the valve 235 normally returns the valve to the position shown in Fig. 14 when the lug 239 becomes disengaged from the valve handle 236 by return movement of the reverse lever 238.

A lost motion connection is provided for the valve handles 234 and 236 in the form of a slotted link 240 pin-connected to the handle 234 and having a slot receiving a pin in the handle 236. This arrangement is such that movement of the handle 236 to the right in Fig. 14 will not disturb the setting of the plug of the valve 230, while if the valve 230 is moved to the right to cut pipe 232 out of the fluid pressure supply line and connect pipe 233 into said line, valve handle 236 will be moved to the right to vent line 229 which up to that time had been connected directly to the fluid pressure source. On such movement of the handle 234 the line 233 will be supplied with pressure from the line 231 and will apply a third tip, for example a tip C, to the steam exhaust pipe 21 through the medium of a suitable fluid pressure cylinder (not shown). On return of the handle 234 to the position shown in Fig. 14 the line 233 will be vented by the valve through the port 241 and the spring associated with valve 235 will normally return that valve to the position shown in the figure, if the position of the reverse lever 238 permits such return.

The handles 234 and 236 may of course be operated manually, independently of the reverse lever. By making the lug or arm 239 adjustable on the reverse lever 238 to a position where it will not engage and move valve handle 236 when the reverse lever is moved to or nearly to full forward position, the handle 236 may be maintained in the position shown in Fig. 14 even when the reverse lever is at or nearly at full forward position, and it may be manually moved to either of its positions without regard to the setting of the reverse lever.

Figure 15:
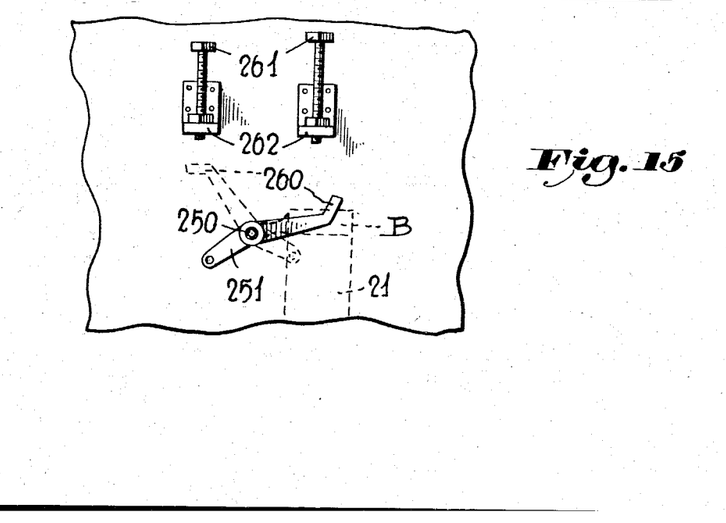
Fig. 15 is a side elevational view of a portion of the outer surface of a smoke box shell showing some of the external connections and parts used in the Fig. 14 embodiment.

In case the fluid pressure control means shown in Fig. 14 should for any reason become inoperative, a selected tip may be held in applied position, and the other tips may be held in retracted position, by means of suitable manually operable clamping means which may conveniently take the form of the brackets and set screws depicted in Fig. 15. As there shown, the end of each rock shaft 250 which protrudes from the smoke box shell carries an angled arm 260 which swings as the rock shaft rotates. In its swing the arm 260 normally clears retracted set screws 261 threaded in brackets 262 so mounted on the smoke box shell that when the fluid pressure actuating means for any reason fails one or another of the set screws can be turned down to engage the arm 260 to clamp it in position to hold the cooperating tip A or B in retracted or applied position. In case of failure of the fluid pressure actuating means, a trainman can, without stopping the locomotive, walk out on the runningboard and turn down appropriate set screws 261 to clamp a selected tip in retracted position and another selected tip in applied position, the use and function of these set screws 261 being like those of the set screws 141, previously described and explained.

It will be appreciated that to operate and control the pressure in cylinders 201 and cylinders 216 and 218 rotary valves of the general type shown at 230 and 235 may be used. Of course any other appropriate fluid pressure control may be employed such as the magnet valves shown in Figs. 2 and 3.

It is thought that from the foregoing explanation, taken in conjunction with the drawings, the construction, operation and principal utility and advantages of the invention will be understood. Numerous further modifications are contemplated as within the spirit of the invention, as are various changes in details. All such modifications and changes are deemed to be within the scope of the invention as defined by the appended claims.

I claim:

1. In a draft and back pressure regulating device for the smoke box of a locomotive, an exhaust steam pipe having a conical terminal seat, a removable tip therefor having an interfitting conical cooperating seat and movably mounted adjacent to said pipe, and tip-shifting means movable in one direction for bodily lifting the tip from the exhaust steam pipe seat and to a side thereof out of obstructing relation with steam issuing from said pipe and movable in the opposite direction for clamping the tip on the exhaust steam pipe seat, said tip-shifting means including yieldable constantly active pressure means connected to the tip and operative when the tip is in the last named position to apply the full force of its pressure to keep the tip clamped on the exhaust steam pipe seat with said two seats urged by said pressure into interfitting engagement, whereby a steam tight joint is provided.

2. In a draft and back pressure regulating device for the smoke box of a locomotive, an exhaust steam pipe having a terminal seat, a plurality of tips therefor having different orifice areas and each having a seat adapted to fit said pipe seat, said tips being movably mounted adjacent to said pipe and adapted to be selectively disposed directly on said pipe with the seat of a tip engaged with said pipe seat to modify the effective steam outlet orifice of the pipe, and fluid pressure operated means connected to said plurality of tips for selectively clamping said tips on said pipe with the engaged seats held by fluid pressure in steamtight engagement.

3. In a draft and back pressure regulating device for the smoke box of a locomotive, a smoke stack passage, an exhaust steam pipe aligned with the passage and having a terminal seat, a plurality of tips for said seat having perimetric lips defining orifice areas of different size, the tip of smaller orifice area being shorter from its perimetric lip to its opposite end than the tip of larger orifice area, whereby the impingement line in the passage of steam from the pipe is substantially the same for each of the tips, and means connected to said plurality of tips for selectively moving said tips to seat said opposite ends of the tips on said pipe seat.

4. In a draft and back pressure regulating device for the smoke box of a locomotive, a smoke stack passage, an exhaust steam pipe aligned with the passage and having a terminal seat, a plurality of tips for said seat each having at one end a seat adapted to engage and fit the pipe seat and each having at its opposite end a perimetric lip defining an orifice, the orifices of the several tips being of respectively different sized areas and the length of each tip between its seat and its lip being approximately directly proportional to the size of its orifice area, whereby the impingement line in the passage of steam from the pipe is substantially the same for each of the tips, and means connected to said plurality of tips for selectively moving said tips to seat said tip seats on the pipe seat.

5. In a draft and back pressure regulating device for the smoke box of a locomotive, a smoke stack passage, an exhaust steam pipe having a terminal seat below the stack passage and adapted to direct a radially expanding jet of steam into the stack passage, a plurality of tips for said pipe having perimetric lips defining orifice areas of respectively different size and each having a seat at its opposite end, and means connected to said plurality of tips for selectively seating said opposite ends of the tips on said pipe seat, the lengths of the several tips being respectively different, so that the lip of the tip of smaller orifice area will be farther from the stack passage when said tip is seated on the pipe seat than will be the lip of the tip of larger orifice area when such tip is seated on the pipe seat, whereby the steam impingement line in the stack passage for each of the tips is substantially the same.

6. In a draft and back pressure regulating device for the smoke box of a locomotive, a smoke stack passage, an exhaust steam pipe having a terminal seat below the stack passage and adapted to direct a radially expanding jet of steam into the stack passage, a plurality of tips mounted adjacent to the pipe for selective application thereto including a relatively short tip having a relatively small discharge orifice area and a relatively long tip having a relatively large discharge orifice area, and means connected to said plurality of tips for selectively seating said tips on said pipe seat, whereby the steam impingement line in the stack passage for each of the tips is substantially the same.

7. In a draft and back pressure regulating device for the smoke box of a locomotive, an exhaust steam pipe having an outlet end provided with a terminal seat, a plurality of tips therefor each engageable with said seat and each mounted independently of the other adjacent to the pipe for movement selectively on to and off the pipe, a separate mechanism for moving each tip, and a connection between said mechanisms for actuating one mechanism to remove from the pipe seat a tip which is engaged therewith prior to operation of another mechanism to move another tip on to the pipe.

8. In a draft and back pressure regulating device for the smoke box of a locomotive, an exhaust steam pipe in said smoke box having a terminal seat, a plurality of interchangeable tips of different orifice areas therefor, air pressure means operatively connected to said tips for interchanging them on the pipe seat, magnetic valve means for controlling the supply of air pressure to the air pressure means, and an electric circuit including the magnetic valve means and a manually operable switch for selectively operating the magnetic valve means.

9. In a draft and back pressure regulating device for a locomotive having a smoke box, an exhaust steam pipe therein, and a reverse lever and quadrant, a plurality of interchangeable tips of different orifice areas for said pipe movably mounted adjacent thereto, and means operatively connected with the reverse lever and with said tips for selectively abruptly moving either of said tips from a fully retracted position to a position fully applied to said pipe responsive to the reverse lever being moved to a predetermined point on its quadrant.

10. In a draft and back pressure regulating device for a locomotive having a smoke box, an exhaust steam pipe therein, a throttle and quadrant therefor, and a reverse lever and quadrant therefor, a plurality of interchangeable tips of different orifice areas for said pipe movably mounted adjacent thereto, and means operatively connected with said tips and with the reverse lever and throttle for selectively abruptly moving either of said tips from a fully retracted position to a position fully applied to said pipe responsive to the reverse lever and the throttle being moved to predetermined points on their respective quadrants.

11. In a draft and back pressure regulating device for a locomotive having a smoke box, an exhaust steam pipe therein, a throttle and a quadrant therefor, and a reverse lever and quadrant therefor, a plurality of interchangeable tips for said pipe movably mounted adjacent thereto, means for selectively applying said tips to said pipe, an electrical control means therefor including a multi-contact switch connected with each of said throttle and reverse lever, a source of current, and an electrical circuit connecting said electrical control means and said switches with said source of current for selectively energizing said electrical control means so as abruptly to move one or another of said tips from a fully retracted position to a fully applied position on said pipe upon the reverse lever and the throttle being moved to predetermined points on their respective quadrants.

12. In a draft and back pressure regulating device for a locomotive having a smoke box, an exhaust steam pipe therein, a throttle and a quadrant therefor, and a reverse lever and quadrant therefor, a plurality of interchangeable tips for said pipe movably mounted adjacent thereto, means for moving said tips, a source of electric current, an electrical control therefor, a multi-contact switch connected with each of said throttle and reverse lever, a multi-contact switch responsive to steam pressure, a master control switch, and a circuit connecting said switches with said current source and said electrical control for selectively energizing said electrical control so as abruptly to move one or another of said tips from a fully retracted position to a fully applied position on said pipe upon the throttle and reverse lever being moved to predetermined points on their respective quadrants, or upon the application of predetermined pressure to the steam pressure switch, depending on the position of the master control switch.

13. In a draft and back pressure regulating device for a locomotive having a smoke box, an exhaust steam pipe therein, a throttle and a quadrant therefor, and a reverse lever and quadrant therefor, a plurality of interchangeable tips for said pipe, an electrical control therefor, a source of electric current, a multi-contact switch connected with each of said throttle and reverse lever, a manual switch, a master control switch, and a circuit connecting the current source to the electrical control through the master control switch and one or another of said other switches depending on the position of the master control switch, whereby said tips will be abruptly moved to fully applied positions on said pipe upon the throttle and reverse lever being moved to predetermined points on their respective quadrants or upon the manual control switch being moved to a predetermined position, depending on the position of the master control switch.

14. In a draft and back pressure regulating device for a locomotive having a smoke box and an exhaust steam pipe therein, rock shafts journaled along opposite sides of the pipe at right angles to the axis thereof, a tip fast on each shaft adapted to fit and be applied in direct engagement with the end of the pipe by swinging down onto the pipe upon rotation of its rock shaft, and means for rocking alternatively either shaft to apply its tip and for simultaneously rocking the other shaft to retract its tip.

15. In a draft and back pressure regulating device for a locomotive having a smoke box and an exhaust steam pipe therein having a terminal seat, a plurality of interchangeable tips of mutually different orifice areas for the pipe, separate means mounting each tip for application to and retraction from the pipe seat to provide selective orifice areas for the pipe, mechanisms for moving the tips, a connection between said mechanisms requiring in the operation thereof complete disengagement of an applied tip from the pipe seat before engagement of a retracted tip with the pipe seat, and means for operating said mechanisms.

16. In a draft and back pressure regulating device for a locomotive having a smoke box and an exhaust steam pipe therein, a plurality of interchangeable tips of mutually different orifice areas for the pipe, separate means for moving each tip on to and off said pipe, each of said last named means comprising an air pressure cylinder on the outer side of the locomotive having a piston connected to a tip and including a spring adapted to be compressed when said tip is being applied to the pipe and adapted to expand when said tip is being retracted from the pipe, and means for supplying air under pressure to each of said cylinders.

17. In a draft and back pressure regulating device for a locomotive having a smoke box and an exhaust steam pipe therein, a plurality of interchangeable tips of mutually different orifice areas for the pipe, separate means for moving each tip on to and off said pipe, each of said last named means comprising a fluid pressure cylinder having a piston connected to a tip and including a spring adapted to be compressed when said tip is being applied to the pipe and adapted to expand when said tip is being retracted from the pipe, and means for supplying fluid pressure simultaneously to each of said cylinders whereby the fluid pressure acts in aid of one of said springs to retract an applied tip and in opposition to another of said springs to apply a retracted tip.

18. In a draft and back pressure regulating device for the smoke box of a locomotive, an exhaust steam pipe having a terminal seat, a pair of selectively applicable tips therefor each having an arm connected to it, gear means connected to each arm, means pivotally mounting said arms on opposite sides of the pipe, and a common driving member having teeth engageable with each of the the gear means for simultaneously retracting an applied tip and applying a retracted tip, and means for controlling the operation of the common driving member.

19. In a draft and back pressure regulating device for the smoke box of a locomotive, an exhaust steam pipe having a terminal seat, a pair of selectively applicable tips therefor each having an arm connected to it, gear means connected to each arm, means pivotally mounting said arms on opposite sides of the pipe, a common driving member having teeth engageable with each of the gear means for pivotally swinging said tips selectively into and out of engagement with said pipe and disengageable with the gear means of a tip which is fully retracted, fluid pressure means for operating the driving member, a latch for holding a fully retracted tip with its gear means disengaged from the common driving member during the initial portion of the operation of the common driving member to retract the applied tip, and means for controlling the fluid pressure means.

20. In a draft and back pressure regulating device for the smoke box of a locomotive having a reverse lever, an exhaust steam pipe having a terminal seat, a plurality of selectively applicable tips therefor mounted adjacent to the pipe for movement on to and off of the pipe, and fluid pressure means connected to the tips for simultaneously moving them, said means comprising a cylinder for each tip, a piston in each cylinder connected to one of the tips, a source of fluid under pressure, and a valve interposed between said source and said cylinders operable by movement of the reverse lever only after the reverse lever has passed through a predetermined portion of its quadrant to supply fluid pressure to said cylinders selectively.

21. In a draft and back pressure regulating device for the smoke box of a locomotive having a reverse lever, an exhaust steam pipe having a terminal seat, a plurality of selectively applicable tips therefor movably mounted adjacent to the pipe for application thereto and retraction therefrom, fluid pressure means connected to the tips for simultaneously moving them, said means comprising a cylinder for each tip, a piston in each cylinder connected to one of the tips for controlling its movement, a source of fluid under pressure, a pair of valves, a pipe connecting the first of said valves with said source, another pipe connecting said valve with one of the cylinders, and a third pipe connecting said valve with the second valve, pipes connecting the second valve separately with others of the cylinders, and operating means for the valves responsive to the position of the reverse lever and comprising a connection between the valves whereby pressure from the source is supplied selectively to the first named cylinder to apply to the steam pipe the tip connected to the piston in said cylinder or through the second valve to said other cylinders to apply one of the tips controlled by the pistons in said cylinders and retract the remainder of the tips controlled by said other cylinders, depending on the position of the reverse lever.

22. In a draft and back pressure regulating device for the smoke box of a locomotive, an exhaust steam pipe having a terminal seat, a plurality of tips therefor having different orifice areas and each having a complemental seat adapted to fit said pipe seat, said tips being movably mounted adjacent to said pipe and adapted to be selectively disposed directly on said pipe with the seat of a tip engaged with said pipe seat to modify the effective steam outlet orifice of the pipe, and yieldable constantly active pressure operated means connected to said plurality of tips for removing one of said tips from engagement with the pipe seat and clamping another of said tips selectively down into steamtight engagement with said pipe and maintaining said engagement steamtight by the force of said pressure.

23. In a draft and back pressure regulating device for the smoke box of a locomotive, an exhaust steam pipe having a terminal seat, a plurality of interchangeable tips therefor, fluid pressure means operatively connected to said tips for interchanging them on the pipe seat, a supply of air under pressure controlling the application of said fluid pressure means, magnetic valve means for controlling the application of air under pressure, and an electric circuit including the magnetic valve means and a switch for operating the magnetic valve means.

24. In a draft and back pressure regulating device for the smoke box of a locomotive, an exhaust steam pipe having a terminal seat, a tip mounted for movement onto said seat and for retraction therefrom, fluid pressure means operatively connected to said tip for moving it onto said seat, a supply of air under pressure controlling the application of said fluid pressure means, magnetic means for controlling the application of air under pressure, and an electric circuit including the magnetic means and a switch for operating the magnetic means.

25. In a draft and back pressure regulating device for a locomotive having a smoke box and an exhaust steam pipe therein, a plurality of interchangeable tips of mutually different orifice areas for the pipe, separate means for moving each tip on to and off said pipe, air pressure cylinder and piston means mounted on the outer side of the locomotive connected to said separate means, spring means adapted to be compressed when a tip is being applied to the pipe and adapted to expand when said tip is being retracted from the pipe, and means for supplying air under pressure to said cylinder and piston means.

26. In a draft and back pressure regulating device for the smoke box of a locomotive, an exhaust steam pipe having a terminal seat, a tip therefor having a cooperating seat and movably mounted adjacent to said pipe, a member movable with the tip, remotely controlled means normally operable for moving the tip to a position seated in steamtight relation on the pipe and to a position retracted therefrom, and a setscrew adapted to react directly between a stationary part of the locomotive and said member for maintaining a force on the member to positively hold the tip seated in steamtight relation on the pipe on failure of the remotely controlled means.

27. In a draft and back pressure regulating device for the smoke box of a locomotive, an exhaust steam pipe in the smoke box having a seat provided on its outlet end, a plurality of independent interchangeable tips for the pipe each having a seat complemental to the pipe seat, each separately mounted for alternative application of its seat to the pipe seat, and each having an opening of different area for varying the effective orifice area of the pipe, a member connected to each tip and movable with it when the tip moves in applying or retracting direction, means interconnecting said members operable for moving one member in tip-applying direction and simultaneously moving in tip-retracting direction the member connected to an applied tip, yieldable constantly active pressure means for operating said interconnecting means, and a selective control for the pressure means whereby the same may be actuated to retract an applied tip and simultaneously apply a retracted tip and maintain the latter with its seat clamped against the pipe seat by said pressure so that said seats provide a steamtight joint.

28. In a draft and back pressure regulating device for a locomotive having a smoke box, an exhaust steam pipe therein, and a throttle and quadrant therefor, a plurality of interchangeable tips of different orifice areas for said pipe movably mounted adjacent thereto, and means operatively connected with the throttle and with said tips for selectively abruptly moving either of said tips from a fully retracted position to a position fully applied to said pipe responsive to the throttle being moved to a predetermined point on its quadrant.

29. In a draft and back pressure regulating device for a locomotive having a smoke box, an exhaust steam pipe therein, a plurality of interchangeable tips of different orifice areas for said pipe movably mounted adjacent to the pipe, an electric switch responsive to steam pressure in the locomotive, an electrical device controlled by said switch, and means controlled by the electrical device and operatively connected with said tips for selectively abruptly moving either of said tips from a fully retracted position to a position fully applied to said pipe responsive to the application of predetermined pressure to the steam pressure responsive switch.

30. In a draft and back pressure regulating device for a locomotive having a smoke box, an exhaust steam pipe therein, a plurality of interchangeable tips of different orifice areas for said pipe movably mounted adjacent to the pipe, electrically controlled means for moving said tips, a multi-contact switch controlling the electrically controlled means, and means operatively connected with said electrically controlled means and said tips for selectively abruptly moving either of said tips from a fully retracted position to a position fully applied to said pipe responsive to the position of the switch.

31. In a draft and back pressure regulating device for the smoke box of a locomotive, an exhaust steam pipe having a terminal circular seat including a circumferential beveled portion, a removable tip therefor having a cooperating seat including a complementally beveled portion for interfitting with the pipe seat, said tip being movably mounted adjacent to said pipe, and tip-shifting means movable in one direction for bodily lifting the tip from the exhaust steam pipe seat and to a side thereof out of obstructing relation with steam issuing from said pipe and movable in the opposite direction for clamping the tip on the exhaust steam pipe seat, and tip-shifting means including yieldable constantly active pressure means connected to the tip and operative when the tip is in the last named position to apply the full force of its pressure to keep the tip clamped on the exhaust steam pipe seat with said two seats urged by said pressure into interfitting engagement, whereby said pressure provides a steamtight joint and whereby said beveled portions tend to center the tip seat on the pipe seat.

32. In a draft and back pressure regulating device for the smoke box of a locomotive, an exhaust steam pipe having a terminal seat, a removable tip therefor having a cooperating seat and movably mounted adjacent to said pipe, tipshifting means movable in one direction for bodily lifting the tip from the exhaust steam pipe seat and to a side thereof out of obstructing relation with steam issuing from said pipe and movable in the opposite direction for clamping the tip on the exhaust steam pipe seat, said tipshifting means including a member operable by yieldable constantly active pressure connected to the tip and operative when the tip is in the last named position to keep the tip clamped on the exhaust steam pipe seat with said two seats urged by said pressure into steamtight engagement, and a control device for abruptly applying the force of said pressure to rapidly throw the tip into said engagement.

33. In a locomotive, an exhaust nozzle device including a bottom portion and a pair of ring-shaped top portions of relatively different internal diameters, a pivot shaft for each top portion, hinge eyes for the pivot shafts mounting the shafts to extend from diametrically opposite points on the bottom portion of the nozzle, crank arms on the shafts, a source of fluid pressure medium, fluid pressure cylinders each having a piston therein, a supply pipe connecting each cylinder with the said source, each piston being connected to the crank arm of a respective pivot shaft, fluid pressure pipes cross connecting the cylinders, respective magnet valves for the cylinders connected in said supply pipes controlling the admission of fluid pressure medium into and release of fluid pressure medium out of the cylinders, and a steam sylphon switch connected in circuit with the magnet valves and connected to the steam exhaust passages of the locomotive cylinders for energizing the magnet valves alternatively with respect to each other to interchange the top portions of the nozzle on the bottom portion of the nozzle.

34. In a locomotive, an exhaust nozzle device including a bottom portion having a conical seat formed on the top edge and a pair of interchangeable ring-shaped top portions each having a conical seat adapted to seat on the conical seat of the bottom portion, one of the top portions being large enough in diameter to reduce excessive consumption of fuel and high back pressure when the locomotive is laboring at or near its maximum capacity and the other top portion being small enough in diameter to make sufficient steam when the locomotive is operating with the valves at short stroke, an arm projecting from each top portion, a respective operating shaft connected to each arm, oppositely disposed bearings on the bottom portion of the nozzle receiving the respective operating shafts, and electrically controlled fluid pressure means responsive to back pressure built up in the exhaust passages of the locomotive cylinders connected to the operating shafts for interchanging the top portions on the bottom portion of the nozzle.

35. In a locomotive, an exhaust device including a bottom portion and a pair of ring-shaped top portions of relatively different internal diameters hinged at opposite points to the bottom portion and adapted to be selectively disposed on top of the bottom portion to provide an exhaust nozzle of variable diameter, and electrically controlled fluid pressure operated means connected to the top portions for interchanging the top portions on the bottom portion of the nozzle, said means comprising a source of pressure medium, cylinders connected to said source, pistons in the cylinders connected to respective top portions of the nozzle, respective magnet valves controlling the admission of fluid pressure medium into and the release of the fluid pressure medium out of the cylinders, and a steam sylphon switch connected in circuit with the magnet valves and connected to the steam exhaust passages of the locomotive for energizing the magnet valves alternatively with respect to each other.

WESTFIELD H. KEILER.